Oct. 8, 1968  F. L. DERROR  3,405,203
METHOD OF MAKING CERAMIC SHAPES

Filed Jan. 10, 1966  4 Sheets-Sheet 1

INVENTOR.
FRED L. DERROR
BY *Hamilton & Cook*
ATTORNEYS

Oct. 8, 1968   F. L. DERROR   3,405,203
METHOD OF MAKING CERAMIC SHAPES

Filed Jan. 10, 1966   4 Sheets-Sheet 2

INVENTOR.
FRED L. DERROR
BY Hamilton & Cook
ATTORNEYS

Oct. 8, 1968   F. L. DERROR   3,405,203
METHOD OF MAKING CERAMIC SHAPES
Filed Jan. 10, 1966   4 Sheets-Sheet 3

INVENTOR.
FRED L. DERROR
BY Hamilton & Cook
ATTORNEYS

Oct. 8, 1968 F. L. DERROR 3,405,203
METHOD OF MAKING CERAMIC SHAPES
Filed Jan. 10, 1966 4 Sheets-Sheet 4
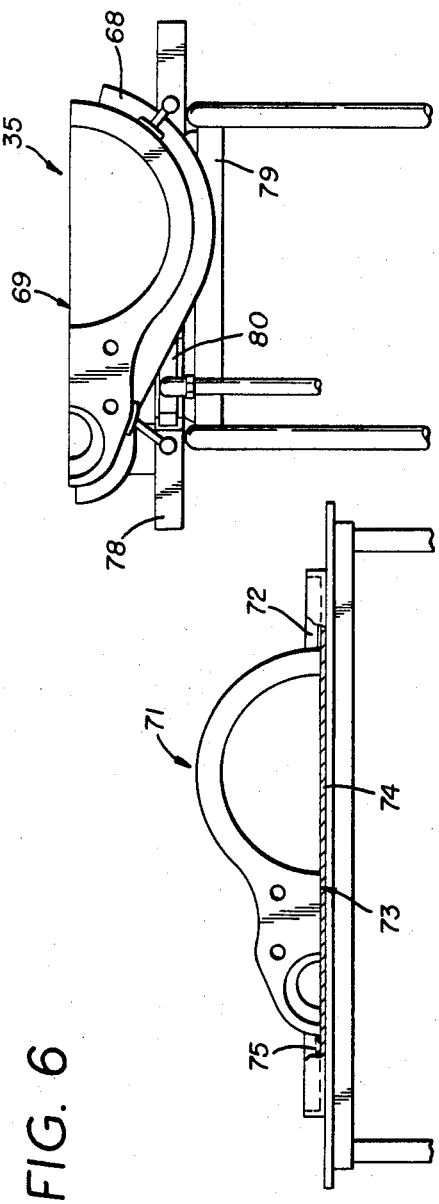
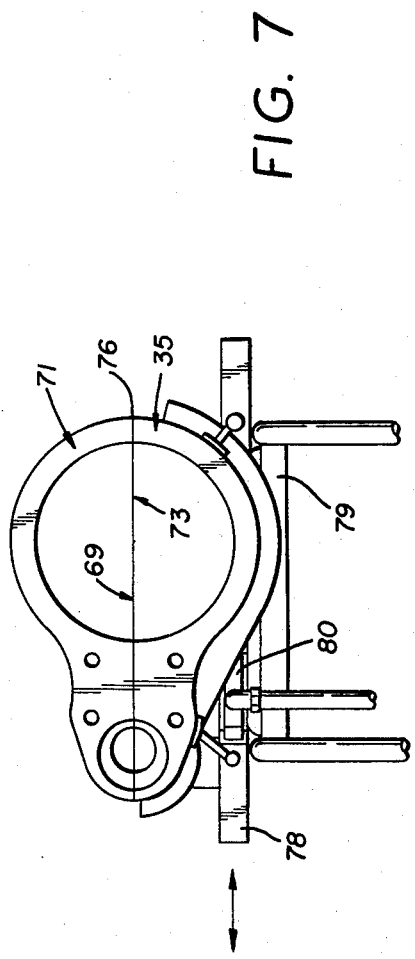
FIG. 6
FIG. 7
INVENTOR.
FRED L. DERROR
BY Hamilton & Cook
ATTORNEYS

United States Patent Office 3,405,203
Patented Oct. 8, 1968

3,405,203
METHOD OF MAKING CERAMIC SHAPES
Fred L. Derror, Lucas, Ohio, assignor to Mansfield Sanitary, Inc., Perrysville, Ohio, a corporation of Ohio
Filed Jan. 10, 1966, Ser. No. 519,611
10 Claims. (Cl. 264—69)

ABSTRACT OF THE DISCLOSURE

A method for making ceramic shapes. The shapes are cast in sections which are matingly juxtapositionable along joinder surfaces while only green cured. The joinder surfaces are preferably lubricated and conformed so as to be contiguous. Thereafter, one section is vibrated with respect to the other to cause an amalgamated joinder of the opposed sections. The resulting shape is then fired.

---

The present invention relates generally to the joining of formed ceramic sections into an integral item. More particularly, the present invention relates to the joinder of green cured, mating sections of formed ceramic shapes by vibration.

While the subject invention is well adapted for the joinder of ceramic shapes formed in any of a host of known ways, both the method and its advantages can be clearly understood by relating the disclosure to one adaptation, the difficulties of which have heretofore plagued those working in the ceramic art to an easy solution—namely, the formation of a water closet bowl.

Historically, water closet bowls containing an inlet water passageway and a siphon-trap have required tedious, time consuming fabrication methods. One of the earliest methods, and that still most frequently used, involves the casting of the outer bowl and the internal divider walls separately. Thereafter, the separately cast internal walls are pressed into proper position within the outer bowl to form the required passages. These separately cast internal walls are retained and joined to the outer bowl by a thick slurry of liquid slip, often mixed with wheat germ, which is applied as a heavy bead along the joinder line of the parts to be joined. This bead material can be dried and fired with the assembled parts.

The most obvious drawback to this procedure is the inordinate amount of skilled labor necessary to cast and assemble the various components required. Less obvious, but equally as undesirable, is the fact that if the component parts are not of the same consistency they will shrink incompatibly and one or more of the parts will crack during the firing. Another drawback is that the excess of the slurry bead must be scraped away from the exposed joints and that which remains along the inaccessible joints becomes a roughened obstruction to the free flow of refuse through the exit passageway. Moreover, here too, differences between the consistency of the bead and that of the components joined thereby result in stress concentrations during the firing operation which considerably weaken the joints, sometimes to failure.

These many disadvantages have engendered many attempts to improve toilet bowl fabrication methods, none of which have gained industry acceptance, primarily because of their extreme complexity. For example, many proposed methods use a plurality of complicated molds and interfitting cores, some of which require multiple mold and core arrangements for sequential casts and others of which utilize drain casting techniques and the close attention required thereby. Further proposed methods demand permanent—i.e., non-removable—coring which remains in the bowl. This coring is often a previously slip cast structure which not only requires additional labor but also subjects the bowl in which it is incorporated to possible shrinkage cracking.

Furthermore, many of these prior known methods still require securing the final component with the slurry bead method. At this point it should be noted that the slurry bead method of joining green cast components is not per se defective, but it does have inherent drawbacks which manifest themselves when the excess slurry in the bead extends inwardly of an inaccessible exit passageway or when the joinder made thereby is subjected to the loading forces applied to the finished object.

It is therefore a primary object of the present invention to provide a method for making ceramic shapes by joining green cured, ceramic sections which have been previously joined by slip casting, drain casting or any other method selected, into mating, sections.

It is another object of the present invention to provide a method for producing ceramic shapes, as above, wherein the ceramic shape is formed in opposed, mated sections and the opposed sections are joined together by amalgamation rather than agglutination.

It is still another object of the present invention to provide a method for forming ceramic shapes having tortuous passageways therethrough.

It is yet another object of the present invention to provide a method for joining ceramic sections, as above, which is relatively uncomplicated and can be accomplished by relatively unskilled labor in much less time than prior known methods.

It is a further object of the present invention to provide a method for forming ceramic shapes, as above, without bead joining component parts adjacent any exit passageway or along a joint subjected to loading forces.

It is a still further object of the present invention to provide a method, as above, which is well adapted to the manufacture of water closet bowls without permanent coring and by any selected technique for forming the opposed mated sections.

These and other objects of the invention, as well as the advantages thereof over existing and prior art forms, will be apparent in view of the following detailed description of the attached drawings and are accomplished by means hereinafter described and claimed.

One preferred embodiment of the present method is shown by way of example in the accompanying drawings and hereinafter described in detail without attempting to show all of the various forms and modifications in which the invention might be embodied; the invention being measured by the appended claims and not by the details of the specification.

In the drawings:

FIG. 6 is a schematic elevation of the apparatus used for joining opposed molded sections of the water closet bowl;

FIG. 7 is a further schematic elevation of a portion of FIG. 6 depicting the molded sections positioned to be joined; and, FIG. 8 is an enlarged area of FIG. 2 depicting the addition of the flushing ring.

Figure 1:
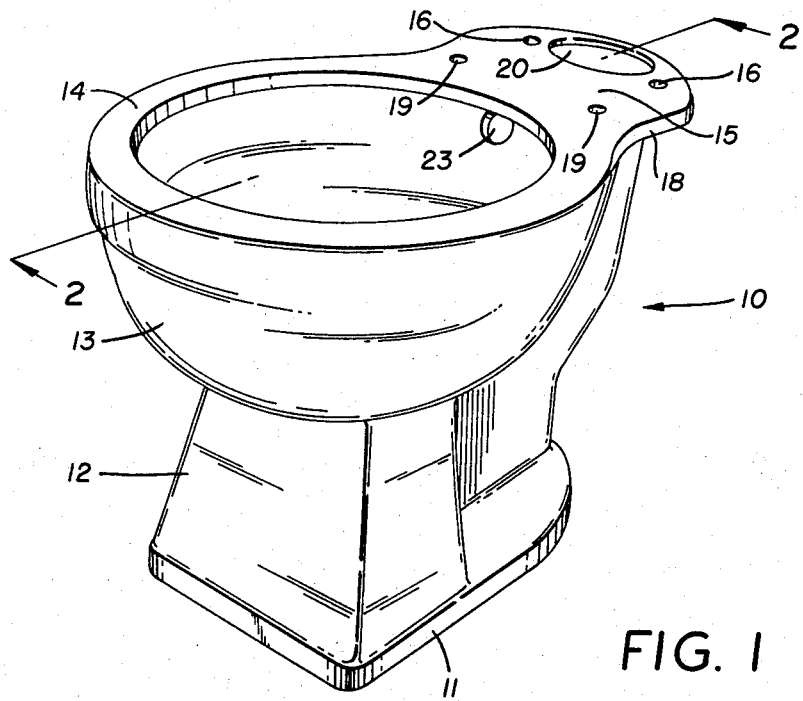
FIG. 1 is a perspective view of a ceramic water closet bowl as sectionally slip cast and joined according to the concept of the present invention.

In general, the method for making ceramic shapes and even those having tortuous passageways therethrough, according to the concept of the present invention, permits use of the desirable slip casting techniques to form opposing sections joinable along the passageways therethrough so that the opposed sections can be cast without complex coring. After the opposed sections are green cured they are removed from the molds and matingly juxtapositioned. When so positioned, the one section is vibrated with respect to the other and the two are thereby joined. As will be apparent from the detailed description to follow, it is often desirable to conform the mating surfaces of the opposed sections, and best results will also require moistening of the mating surfaces in such a way as to have a film of slip on the mating surfaces between the juxtapositioned sections primarily to foster relative movement therebetween and also to assist in the coalescence of the sections upon vibration.

Referring more particularly to the drawings, the exemplary ceramic shape made according to the present invention is the water closet bowl identified generally by the numeral 10. The water closet bowl 10 has a base 11 adapted to rest on the floor for support. A support web 12 extends generally upwardly from the base 11 and carries the bowl portion 13, the upper extent of which terminates in an inwardly directed peripheral lip 14. At the rear of the closet 10 the lip 14 conjoins with a flat connecting shelf 15 which allows close coupling of a water supply tank (not shown), if desired, and to this end two bolt receiving holes 16 are provided in the shoulder 18 of the shelf 15 which extends outwardly of the rear portion 12a of the support web 12. A pair of similar holes 19 are provided through the forward portion of shoulder 18 for mounting of the seat, also not shown.

Figure 2:
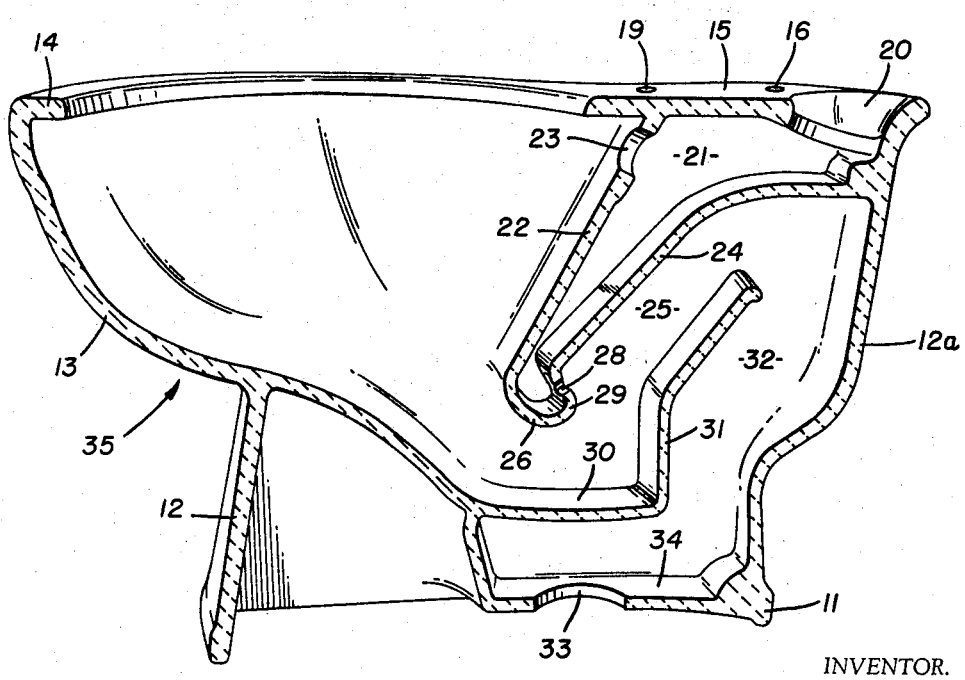
FIG. 2 is an enlarged cross section taken substantially on line 2—2 of FIG. 1.

As best seen in FIG. 2, the water inlet opening 20 through the shelf 15 communicates with a receiving cavity 21 shaped generally in the fashion of a dog-leg. The rearward side of the bowl portion 13 forms the forward wall 22 of cavity 21. The upper portion of the forward wall 22 is provided with a flush bore 23 which communicates between the cavity 21 and the bowl portion 13, as more fully hereinafter described.

The upwardly and rearwardly arched divider wall 24 forms the lower boundary of cavity 21 and the upper side of the siphon-trap passageway 25. The lower portion of the forward wall 22 is joined to the lower portion of the divider wall 24 by a foot portion 26. A bore 28 pierces the upper wall 29 of the foot portion 26 and is directed parallel to the lower portion of the divider wall 24. At the beginning of the flush cycle the surge of flush water into cavity 21 discharges a small jet of water through bore 28 and into the siphon-trap passageway 25 which initiates the immediate siphoning discharge flow therethrough. The inlet opening 20, cavity 21 and bores 23 and 28 thus form a tortuous water admitting passageway.

The lower surface of the bowl portion 13 terminates in a rearwardly extending trap base 30 which joins the generally dog-legged upwardly and then somewhat rearwardly directed trap partition 31. The trap partition 31 forms the rearward wall of the siphon-trap passageway 25 and the forward wall of the exhaust passage 32 which communicates between the siphon-trap passageway 25 and the exhaust port 33 in the base wall 34 of the closet 10. As will be apparent, the upper extent of the trap partition 31 determines the residual water level in the bowl portion 13 between flushing cycles.

The constructional details of the heretofore described water closet bowl 10 do not themselves constitute a feature of the present invention but are instead representative of prior known water closet constructions and typify a ceramic shape having tortuous passageways therethrough which do not readily lend themselves to facile casting by prior known techniques and therefore presents an ideal shape for forming in sections and joining according to the concept of the present invention.

Figure 3:
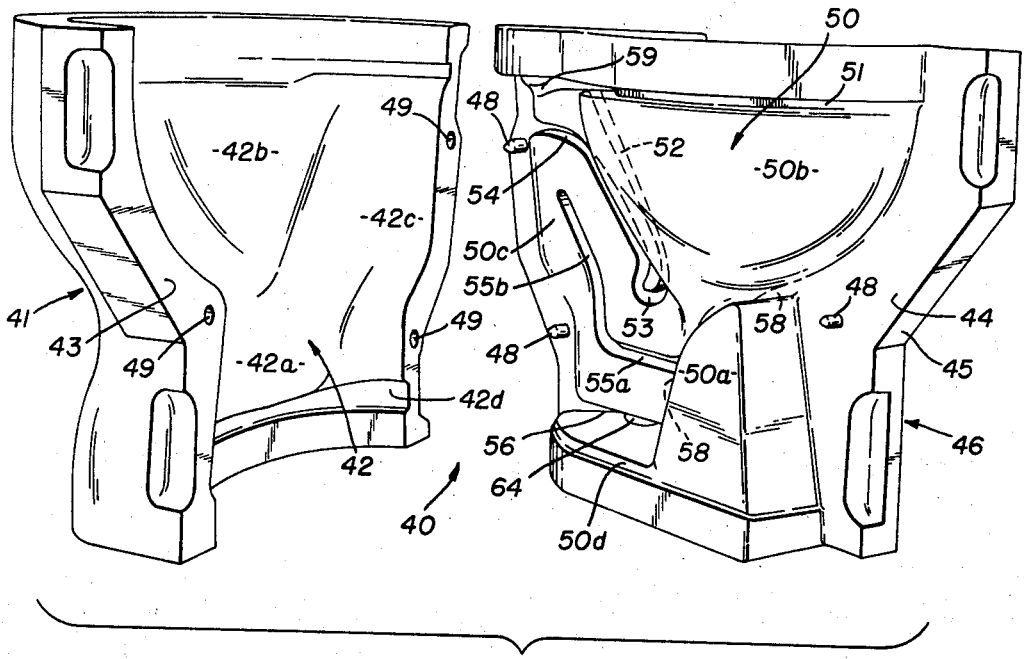
FIG. 3 is a perspective view of a typical sectional mold, prior closure, used to cast that portion of the ceramic water closet bowl depicted in FIG. 2.

In order to eliminate complex coring and to permit withdrawal of the casting from the mold, the ceramic shape is cast in opposed sections such that they can be joined together along the the passageways therethrough. For the water closet 10, in which the passageways 25 and 32 in the cavity 21 are longitudinally aligned, a longitudinal division of the closet into mating sections divided along the plane of section line 2—2 of FIG. 1 is ideal. Hence, the closet 10 is cast into opposing sections of which that depicted in FIG. 2 and indicated generally by the numeral 35 is one, the other being a mirrored, or mating, section thereof (not shown). A separable mold suitable for the casting of such a section 35 is shown in FIG. 3 and indicated generally by the numeral 40. Mold 40 has a receiving portion 41 with a cavity 42 therein which forms the outer contourned surface of the frontal presentation of the web 12 on section 35, by surface 42a; the bowl portion 13, by surface 42b; the rearward presentation 12a of web 12, by surface 42c; and, the base 11, by surface 42d.

Peripherally of the cavity 42, a seat 43 is provided to engage a similar seat 44 of the underside of a shoulder 45 formed on the periphery of the insertable portion 46 of mold 40. Dowel pins 48 extending outwardly of the seat portion 44 on shoulder 45 are receivably insertable within bores 49 in seat 43 to assure proper positioning of the insertable portion 46 with respect to the receiving portion 41. A core-like protuberance 50 extends outwardly of the seat 44 on portion 46 and is insertable within the cavity 42. The distances between the cavity surfaces and those on protuberance 42 define the wall thicknesses of the article cast therein. Specifically, section 50a is spaced from surface 42a to form the desired thickness of the frontal presentation of web 12; section 50b is spaced from surface 42b to form the wall of bowl portion 13; section 50c is spaced from surface 42c to form the desired thickness of the rearward presentation of web 12; and, section 50d is spaced from surface 42d to form the base 11.

The protuberance 50 is scored by a plurality of grooves, or channels, which form the walls of the passageways through the water closet bowl 10. The channel 51 which extends horizontally between the section 50b and the seat 45 forms the peripheral lip 14 and shelf 15. The channel 52 extends upwardly and rearwardly from the curved toe forming channel 53 between the bowl forming section 50b and the rear web forming section 50c to itself define the forward wall 22 of cavity 21. The toe forming channel 53 also conjoins with the upwardly and rearwardly arched channel 54 which forms the divider wall 24. Spaced from channel 54 in section 50c is another horizontal channel 55a the rearward end 55b of which dog-legs upwardly and rearwardly to form the trap base 30 and the trap partition 31, respectively. The third horizontal groove 56 forms the base wall 34 and intersects the upwardly and forwardly extending groove 58, which forms those walls of the bowl portion 13 and the exhaust passage 32 which extend between the base wall 34 and the intersection of the web 12 with the bowl 13.

Boss 59 extends transversely between the shoulder 45 and the protuberance section 50d to form the inlet opening 20, and cylindrical cores 60 and 61 extend through bores 62 and 63, respectively, in shoulder 45, across channel 51 and into protuberance portion 50c to form the holes 16 and 19 through shelf 15. A second boss 64 extends from shoulder 45, across channel 56 and into the protuberance section 50c to form the exhaust port 33.

Figure 4:
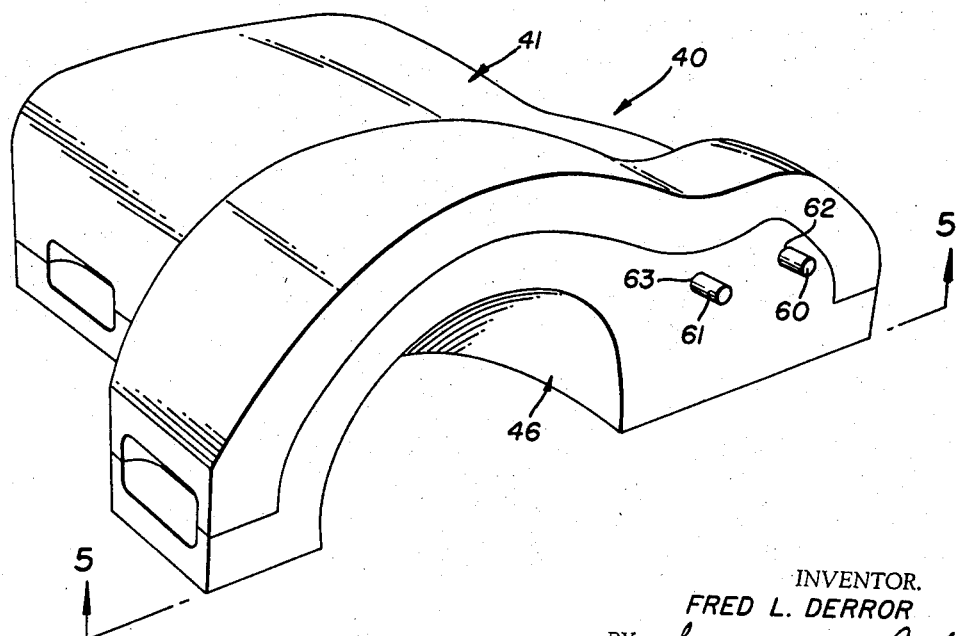
FIG. 4 is an enlarged perspective view of the sectional mold depicted in FIG. 3 closed to receive the slip.
Figure 5:
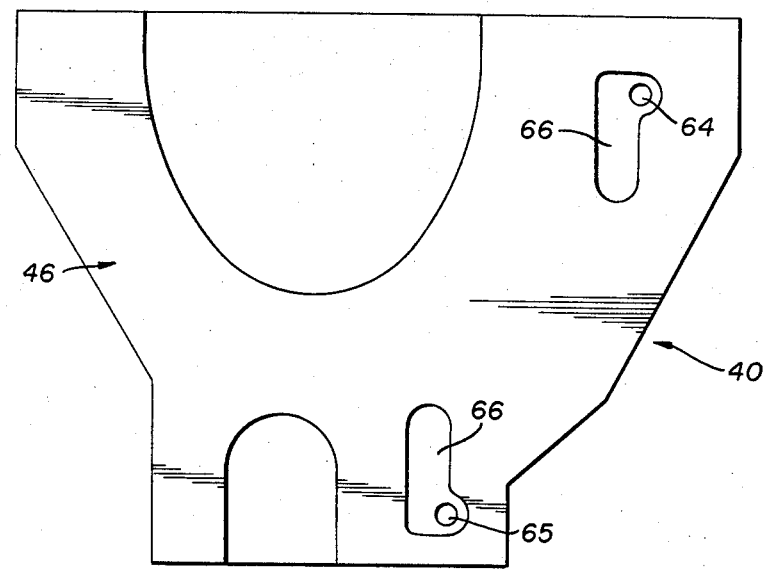
FIG. 5 is a plan view taken substantially on line 5—5 of FIG. 4 depicting the slip receiving wells.

With the two portions 41 and 46 interfitted as mold 40 (FIG. 4), liquid slip is poured into the cavity formed therebetween, as though ports 64 and 65, depicted in FIG. 5. For best results it is highly desirable to utilize a slip well 66 in conjunction with each port. The construction as well as the advantages derived from the use of slip wells are thoroughly discussed in my copending U.S. application, Ser. No. 291,671, filed July 1, 1963, now Patent No. 3,212,156.

With both portions of the mold 40 being made from a water absorbing material such as plaster of Paris, as is standard practice, sufficient moisture is withdrawn from the slip by the mold to leave an initially set, only partially cured, ceramic casting within the mold. Further drying green cures the castings so that, while still exceedingly frangible, they may be carefully handled. When two mating sections are green cured they may be joined according to the concept of the present invention.

The cylindrical cores 60 and 61 are removed from bores 62 and 63 and the mold sections 41 and 46 are separated. The green cured casting is removed therefrom, and, after bore 28 is manually carved in toe 26, the casting is positioned in a supporting palette, or jig 68 which is matchingly contoured to engage the casting received therein over a sufficient portion of its surface to prevent damage thereto during the ensuing steps of the process. As shown in FIG. 6, this positions the planar joinder presentation, or face, 69, comprising all the edges of the casting which are to be matingly joined to corresponding edges on the mirrored section, facing upwardly in a horizontal plane. It should be noted that although it is often not necessary, occasion may arise where it is required to conform the mating surfaces of the castings to be joined before one is placed in its jig 68. For casting 35, which has a planar joinder presentation 69, one form of conformation may comprise simply resting the green cured casting on a flat surface until the joinder presentation 69 fully contacts the flat surface. It may also be desirable in some situations to conform the edges forming the joinder presentation laterally by incorporating die-like grooves in the flat surface on which the casting is conformed into which the edges may be matingly received.

The section 71 to be matingly joined to section 35 is placed in a shallow bath 72 with its joinder presentation 73 facing downwardly in contact with the flat surface 74 defining the bottom of bath 72. The contact of joinder presentation 73 with the flat surface 74 conforms the joinder presentation 73—i.e., it assures that it will perfectly mate with the joinder presentation 69 on casting 35—but even more important it bathes the joinder presentation 69 in a bath of liquid slip 75. This slip 75 which may be of the same consistency as that from which the castings were made, or thinner, does not function as an agglutinate, or a binding agent, for the castings to be joined but primarily provides a compatible lubricating film 76 on the joinder presentation 73.

The jig 68 which carries the casting 35 is securely mounted on a yoke 78 vibratingly connected to a supporting frame 79. A vibrator 80 is fastened to the yoke 78 so as to vibrate the yoke 78, jig 68 and casting 35 parallel to the joinder presentation 69, when desired. As will become apparent, this vibration, or oscillation, is a horizontal reciprocation.

With the casting 35 resting in jig 68 the casting 71 is positioned on top thereof with their respective joinder presentations 69 and 73 matingly opposed and with the film 76 fully covering at least one, preferably the upper, of the two joinder presentations (FIG. 7). With the castings thus positioned, the vibrator 80 is actuated. To those skilled in the art vibration appears deleterious since it is well known that bending, or flexing, of green cured slip severely weakens the material at the flexure zone.

Vibration according to the present concept, however, does not result in any weakening of the castings. The vibrator 80 has a low amplitude of vibration—i.e., on the order of a few thousandths of an inch for joining the water closet sections depicted. This low amplitude, together with the lubricating film 76, permits the casting 35 to oscillate, or vibrate, laterally with respect to the casting 71 along the joinder presentations 69 and 73 without flexure of either of the castings. This is further assured by selecting a vibration frequency compatible with the low amplitude so that the film 76 lubricates, and thus prevents the vibration of casting 35 from overcoming the stationary inertia of the freely supported upper casting 71. While a wide frequency range gives excellent results, a vibration of approximately 20 oscillations per second has been found to be quite satisfactory for forming the water closet mold depicted. The weight of the upper casting 71 acting downwardly during the vibration of the lower casting 35 with respect thereto forces the small amount of water in the film 76 to spew outwardly from between the joinder presentation 69 and 73 and bond the casting together by a consolidation, or coalescence, of the clay between the green cured castings along the joinder presentations. The joinder of the castings 35 and 71 is thus an amalgamation and not merely an aggutination as is taught by prior art joinder techniques.

It has been found that when the castings have advanced too far through the green cure for easy coalescence between the materials in the two castings, the joinder may be induced by also slightly wetting the joinder presentation 69 on casting 35 sufficiently to soften the clay therealong. Plain water has been used satisfactorily.

With the two castings thus joined into the water closet bowl identified by the numeral 10 in FIG. 1, it may be removed from jig 68 and only two more steps are required to prepare the integrally joined castings for firing.

Figure 8:
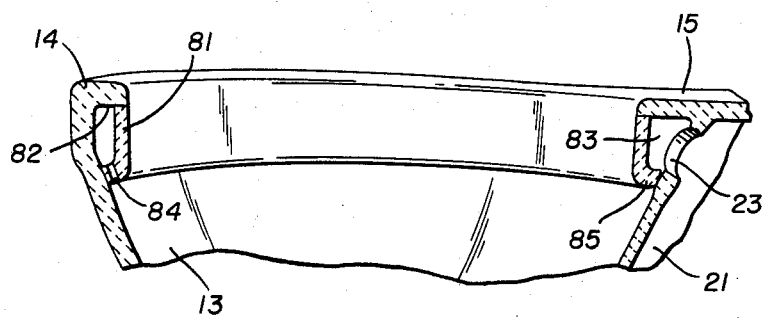

First, the water spewed from between the joinder presentation is sponged off the exposed areas to assure that no sign of a joinder is apparent in the fired product, and second, the flushing ring 81 is attached. As shown in FIG. 8, a J-shaped flushing ring 81 is secured between the underside 82 of the peripheral lip 14 in the bowl portion 13. The flush bore 23 opens into the flush cavity 83 formed peripherally of the bowl portion 13 by ring 81 and emits the flush water received therein through relief apertures 84 provided in the base section 85 of ring 81. Inasmuch as the loading of the closet is carried by the lip 14 which is integrally cast with the two sections of the water closet, the ring 81 is subject to no stresses and may well be agglutinated in position by any of the prior known techniques.

It should thus be apparent that the concept of the subject invention provides a method for amalgamatingly joining green cured, mating sections of a ceramic shape by vibration, and, while this method is shown to be well suited for joining slip cast sections of a water closet bowl, it is not limited either to the casting method employed or the particular product.

What is claimed is:

1. A method for making ceramic shapes comprising the steps of, forming and green curing said shapes in opposed sections having joinder surfaces, placing one said green cured section in mating juxtaposition with the other of said opposed green cured sections so that the joinder surfaces on opposed sections are contiguous, and vibrating one of said opposed juxtaposed sections with respect to the other to amalgamate said sections along the contiguous joinder surfaces.

2. A method, as set forth in claim 1, in which the mating juxtaposed joinder surface of at least one of said opposed sections is lubricated prior vibration.

3. A method, as set forth in claim 1, in which a film of slip is applied to the mating joinder surface of at least one of said sections.

4. A method, as set forth in claim 1, in which a film of liquid slip is applied to the mating joinder surface of one of said sections and the mating surface of the other of said sections is moistened prior juxtapositioning.

5. A method, as set forth in claim 3, in which the mating joinder surfaces of the opposed sections are conformed before they are placed in juxtaposition.

6. A method for making a water closet bowl having a water admitting passageway and a siphon-trap oriented generally longitudinally of each other comprising the steps of, providing sectional molds for casting said water closet bowl in opposed longitudinal sections matingly engageable longitudinally through said water admitting passageway and said siphon-trap, introducing liquid slip in the sectional molds forming said opposing sections, permitting said slip to green cure, removing said green cured, opposed bowl sections, positioning said opposed bowl sections in mating juxtaposition, and vibrating one of said juxtaposed sections with respect to the other to join said sections.

7. A method, as set forth in claim 6, in which the mating juxtaposed surfaces of at least one of said opposed sections is lubricated prior their being placed in juxtaposition.

8. A method, as set forth in claim 6, in which a film of slip is applied to the mating surfaces of at least one of said sections.

9. A method, as set forth in claim 6, in which one of said sections is fully supported with its mating surfaces facing upwardly as a joinder presentation, a film of slip is applied to the mating surfaces of the other of said sections, that section is freely positioned in mating juxtaposition on the upper side of said fully supported section and the fully supported section is vibrated with respect to the freely supported section to join the sections together by amalgamation.

10. A method, as set forth in claim 9, in which the mating surfaces of the opposed sections are conformed before they are placed in juxtaposition.

References Cited

UNITED STATES PATENTS

| | | | |
|---|---|---|---|
| 1,476,445 | 12/1923 | Hill et al. | 264—250 X |
| 1,699,063 | 1/1929 | Hawley | 264—69 X |
| 2,010,934 | 8/1935 | Smith | 264 |
| 2,175,730 | 10/1939 | Laschenski | 25 |

ROBERT F. WHITE, *Primary Examiner.*

J. SILBAUGH, *Assistant Examiner.*